(12) United States Patent
Miller (10) Patent No.: US 6,714,775 B1
(45) Date of Patent: Mar. 30, 2004

(54) INTERFERENCE CANCELLER

(75) Inventor: Jeffry Joseph Miller, Warminster, PA (US)

(73) Assignee: Veridian Engineering, Inc., Alexandria, VA (US)

( * ) Notice: Subject to any disclaimer, the term of this patent is extended or adjusted under 35 U.S.C. 154(b) by 0 days.

(21) Appl. No.: 09/512,259

(22) Filed: Feb. 24, 2000

(51) Int. Cl.[7] .................................................. H04B 1/10
(52) U.S. Cl. ...................................... 455/296; 455/303
(58) Field of Search ................................ 455/296, 285, 455/295, 283, 278.1, 302, 303, 317, 318, 304, 24, 305, 313; 348/607, 609, 627

(56) References Cited

U.S. PATENT DOCUMENTS

| | | | | |
|---|---|---|---|---|
| 3,605,018 A | * | 9/1971 | Coviello | 327/100 |
| 3,938,153 A | | 2/1976 | Lewis et al. | |
| 4,052,559 A | * | 10/1977 | Paul et al. | 333/166 |
| 4,097,866 A | | 6/1978 | Frost et al. | |
| 4,177,430 A | * | 12/1979 | Paul | 455/306 |
| 4,181,892 A | * | 1/1980 | Dilley | 455/306 |
| 4,191,926 A | * | 3/1980 | Pontano et al. | 455/304 |
| 4,266,296 A | * | 5/1981 | Ishigaki | 329/321 |
| 4,408,352 A | * | 10/1983 | Dudding | 455/295 |
| 4,575,862 A | | 3/1986 | Tahara et al. | |
| 4,637,067 A | | 1/1987 | Steinberger | |
| 4,670,885 A | | 6/1987 | Parl et al. | |
| 4,878,251 A | * | 10/1989 | Richardson | 455/206 |
| 4,893,350 A | | 1/1990 | Minamisono et al. | |
| 4,952,193 A | | 8/1990 | Talwar | |
| 4,969,211 A | | 11/1990 | Raymond | |
| 5,046,133 A | | 9/1991 | Watanabe et al. | |
| 5,125,108 A | | 6/1992 | Talwar | |
| 5,134,723 A | * | 7/1992 | Carson | 455/254 |
| 5,289,194 A | | 2/1994 | Schlosser | |
| 5,349,609 A | | 9/1994 | Tsujimoto | |
| 5,355,533 A | * | 10/1994 | Dickerson | 327/113 |
| 5,379,046 A | | 1/1995 | Tsujimoto | |
| 5,418,814 A | | 5/1995 | Hulbert | |

(List continued on next page.)

FOREIGN PATENT DOCUMENTS

| | | |
|---|---|---|
| EP | 0 289 617 | 11/1988 |
| GB | 2 296 615 | 7/1996 |

OTHER PUBLICATIONS

International Search Report for PCT/US01/05654.

Analog Devices; 500 MHz Four–Quadrant Multiplier, AD834; Norwood, MA, 1998, month unknown.

National Semiconductor, CLC449, 1.2GHz Ultra–Wideband Monolithic Op Amp; Apr. 1998; http://www.national.com.

Zeger–Abrams Incorporated; ZAX–U/V; Multiband 30–400 MHz Cosite Interference Canceler for Frequency Hopping Systems; Aug. 1998, Xetron Corporation, Ohio.

B. Widrow et al.; "Adaptive Noise Cancelling: Principles and Applications"; Proceedings of the IEEE, vol. 63, No. 12, Dec. 1975.

*Primary Examiner*—Charles Appiah
(74) *Attorney, Agent, or Firm*—Steptoe & Johnson LLP (57) ABSTRACT

An interference canceller is described, wherein the interference canceller includes an input receiving an input composite signal, a reference circuit, and a cancellation circuit. The interference canceller derives its own reference signal. Internal derivation of the reference signal is accomplished by suppressing the desired signal included within a sampled quantum of a composite signal. The resultant reference signal is a likeness of the interference signal; containing substantially only the interference signal. The internally produced reference signal is amplitude and phase adjusted in a time-continuous fashion and summed with the composite signal in the cancellation circuit. The output of the cancellation circuit contains the desired signal and a substantially suppressed interference signal.

24 Claims, 4 Drawing Sheets

U.S. PATENT DOCUMENTS

| | | |
|---|---|---|
| 5,428,831 A | 6/1995 | Monzello et al. |
| 5,499,399 A | 3/1996 | Bond et al. |
| 5,548,838 A | 8/1996 | Talwar et al. |
| 5,574,978 A | 11/1996 | Talwar et al. |
| 5,584,065 A | 12/1996 | Monzello |
| 5,606,734 A * | 2/1997 | Bahu .......................... 455/303 |
| 5,630,223 A | 5/1997 | Bahu et al. |
| 5,692,018 A | 11/1997 | Okamoto |
| 5,710,799 A | 1/1998 | Kobayashi |
| 5,729,829 A | 3/1998 | Talwar et al. |
| 5,740,208 A | 4/1998 | Hulbert et al. |
| 5,742,900 A * | 4/1998 | Arnstein et al. ............. 327/551 |
| 5,749,051 A * | 5/1998 | Dent .......................... 455/317 |
| 5,778,310 A | 7/1998 | Tong et al. |
| 5,790,606 A | 8/1998 | Dent |
| 5,818,517 A | 10/1998 | Hudson et al. |
| 5,835,848 A | 11/1998 | Bi et al. |
| 5,838,740 A | 11/1998 | Kallman et al. |
| 5,872,540 A | 2/1999 | Casabona et al. |
| 5,901,343 A | 5/1999 | Lange |

* cited by examiner

INTERFERENCE CANCELLER

FIELD OF THE INVENTION

The present invention relates to the field of electromagnetic energy interference cancellation.

BACKGROUND OF THE INVENTION

Receivers, for example radio frequency ("RF") receivers, are typically designed to operate in a given bandwidth (e.g, UHF or microwave bands) and may also be designed to operate over multiple bandwidths. Receivers may be designed to operate on signals occupying a subset of the receiver's overall operating bandwidth. Such a subset may be called a "channel." The frequency at the center of a channel's bandwidth may be called the "channel frequency." Electromagnetic signals from, for example, RF transmitters, may interfere with a receiver's operation even if the electromagnetic signals' frequency spectra do not substantially overlap the receiver's channel frequency. Out-of-channel (also known as out-of-band) interference signals can create adverse effects in a receiver (e.g., desensitization, crossmodulation, and intermodulation). In environments such as airports, communications facilities, or mobile platforms, interference signals are of particular concern due to the proximity of co-located transmitters and receivers. It is desirable to suppress out-of-channel interference signals incident on a receiver's input.

Tunable, or even fixed, preselector filters placed in series with and preceding a receiver may offer some suppression of out-of-channel signals (and therefore some reduction in adverse effects), however, such filters are typically costly. Preselector filters typically possess bandwidths that are substantially larger than the operating channel bandwidth, which is especially true for tunable preselector filters. Furthermore, such filters add weight and occupy physical space that may not be available in certain platforms. Additionally, preselector filters can introduce distortion by, for example, preselector filter group delay.

Devices known as cosite interference cancellers, typically used in environments having co-located transmitters and receivers, have been used to reduce the amount of interference signal that is incident on a receiver. However, known applications of cosite interference cancellers require that a reference signal, sampled from a source external to the cosite interference canceller itself, be applied to the cosite interference canceller's circuitry. The reference signal is typically a sample of an interfering signal. This sample is subtracted from a composite signal; the composite signal contains both the desired and interference signals. U.S. Pat. No. 5,630,223 to Bahu et al. requires a plurality of filter circuits for receiving filtered transmission signals (i.e., samples of interference signals from transmitters). U.S. Pat. No. 5,428,831 to Monzello et al. discloses a reference coupler for sampling the transmitted signal of a co-located radio transmitter. These patents exemplify a class of devices that require a hardwired connection of a reference signal (i.e., the interfering source of electromagnetic energy) to the cosite interference canceller. U.S. Pat. No. 4,893,350 to Minamisono et al. discloses a cosite interference canceller that may be operated with interference sources that are not hardwired to the cosite interference canceller. Minamisono et al. discloses an auxiliary antenna positioned in the direction of the interference signal for collection of essentially only the interference signal. The output of the auxiliary antenna supplies the interference canceller with a reference signal used to cancel the interference signal from a composite signal collected by a main antenna. Minamisono et al. is representative of a class of cosite interference cancellers that use auxiliary antennas to collect reference signals.

SUMMARY OF THE INVENTION

The present invention relates to a method and apparatus for interference cancellation, where interference signals are derived from a composite signal, and where the composite signal contains both the desired and interference signals. The derived interference signal may be used as a reference signal for the interference canceller. A preferred embodiment does not require hardwiring or cooperation between it and an interfering electromagnetic energy source. It operates on a composite signal and may utilize a single input port for signal reception (i.e., a separate reference port is not required). No a priori knowledge of the interfering source's frequency spectrum is required.

The preferred embodiment derives its own reference signal by suppressing the desired signal in a duplicate of the composite signal. Suppression of the desired signal is accomplished in a subcircuit of an interference canceller referred to hereinafter as a Reference Circuit. The Reference Circuit derives a likeness of the interference signal. The likeness of the interference signal may be processed so that it is substantially equal in amplitude and opposite in phase to its counterpart in the original composite signal. The composite signal and likeness of the interference signal may be summed, thereby substantially canceling the interfering signal from the composite signal. The resultant signal, having a substantially suppressed interference signal, may be applied to the input of a receiver. The Reference Circuit may be tunable.

The interference signal may be located close in frequency to the desired signal. The desired signal may have weaker signal strength than the interference signal. No knowledge of the interference signal is needed preferably, only knowledge of the desired signal's center frequency is required. The preferred embodiment is useful to avoid desensitization of receivers through suppression of narrowband or wideband out-of-channel interference. The method and apparatus disclosed herein can be used in conjunction with various weight control algorithms (e.g., the Least Mean Square algorithm).

One object of the invention is to provide an improved interference canceller.

Another object of the invention is to provide an interference canceller that does not need a priori knowledge of an interfering signal's electromagnetic spectral content.

Another object of the invention is to provide weak signal extraction by suppression of strong interference signals.

Another object of the invention is to provide a reference circuit to suppress desired spectral components from a composite signal containing both the desired and the interference spectral components, thereby leaving substantially only the interference spectral components.

BRIEF DESCRIPTION OF THE FIGURES

Preferred embodiments of the present invention are hereinafter described with reference to the accompanying drawings.

DETAILED DESCRIPTION OF PREFERRED EMBODIMENTS OF THE INVENTION

Figure 1:
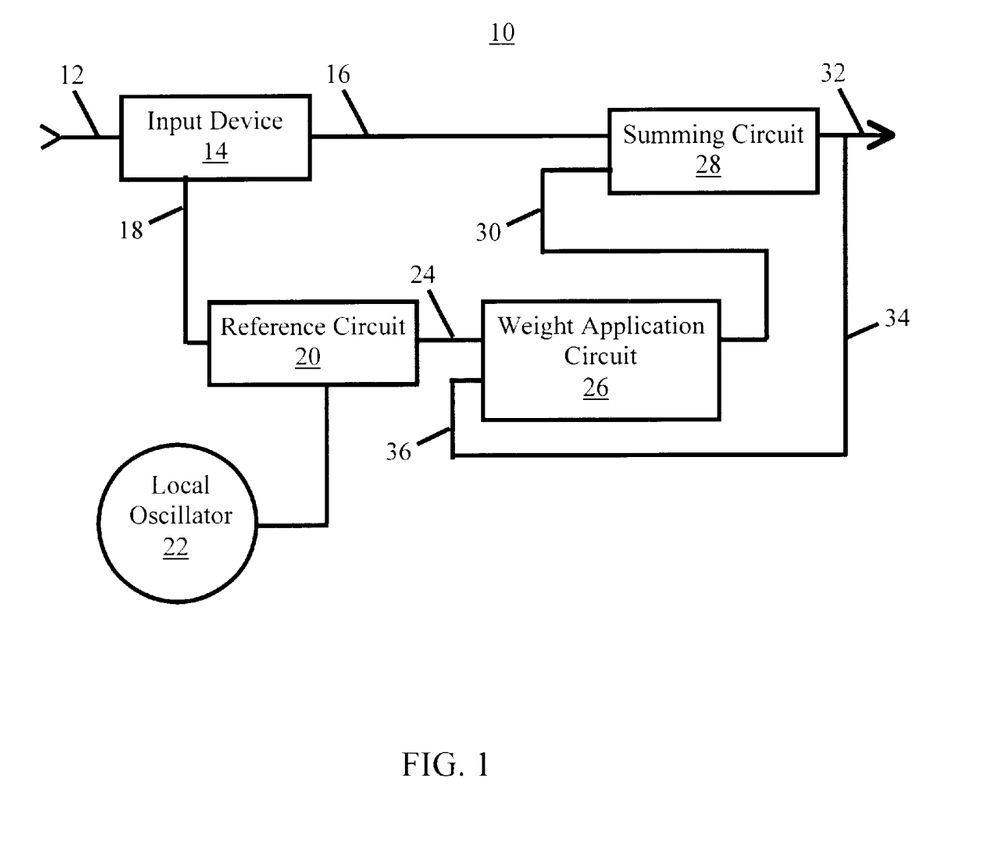
FIG. 1 illustrates a block diagram of a preferred embodiment of an interference canceller.

FIG. 1 illustrates a block diagram of a preferred embodiment of an interference canceller 10. The interference canceller 10 generally operates as follows. An input composite signal is applied to a first port 12 of an input device 14. The input composite signal contains both desired and interference signals. As used herein, the term "signal" refers to electromagnetic energy that may or may not contain information. The input device 14 divides, splits or otherwise shares a first and second quantum of the composite signal between a first path 16 and a second path 18. A Reference Circuit 20 is operatively connected to the second path 18 and receives its input therefrom.

The Reference Circuit 20 suppresses the desired signal included within the second quantum of composite signal that was applied to the Reference Circuit 20. The output of the Reference Circuit 20 includes predominantly a likeness of the interference signal. (For the purpose of description here, a "likeness" refers broadly to a correlated signal produced by any method, including but not limited to operating on energy taken from an original signal, generating a duplicate signal, or otherwise, and without limitation to ancillary signal processing, such as filtering, amplifying, etc. A likeness may also include the original signal itself.)

Suppression of the desired signal within the Reference Circuit 20 is accomplished at an intermediate frequency, which is generally a frequency other than the desired signal's channel frequency. To convert the desired signal's channel frequency to the Reference Circuit's intermediate frequency, a local oscillator (in conjunction with other circuitry explained with reference to FIGS. 2, 3, and 4) is used. The local oscillator 22 frequency preferably equals the center frequency of the desired signal plus or minus an intermediate frequency of the Reference Circuit 20. The addition or subtraction of the intermediate frequency is dependent upon whether the Reference Circuit 20 first up-converts or first down-converts the input composite signal. The local oscillator 22 output is operatively connected to the Reference Circuit 20. The local oscillator 20 may be tunable.

The output of the Reference Circuit 20 is applied to a first input 24 of a Weight Application Circuit 26. In the preferred embodiment, the Weight Application Circuit 26 is an analog-based Least Mean Square ("LMS") algorithm. Other implementations may be possible, including, for example, a Recursive Least Square algorithm. Weight application algorithms may also be called adaption algorithms and have application in the field of adaptive filtering.

The Weight Application Circuit 26 adjusts, in a time-continuous fashion, the amplitude and phase of the signal output by the Reference Circuit 20. The amplitude and phase adjusted signal is summed with the composite signal that was output from the input device 14 and was passed along the first path 16. Summing occurs in a summing circuit 28. The amplitude and phase adjusted likeness of the interference signal substantially cancels the interference signal present in the first path's 16 composite signal. The output 32 of the interference canceller includes the desired signal and a substantially suppressed interference signal.

The Weight Application Circuit's 26 amplitude and phase adjustment is enabled by a continuous sample of the signal from the output 32 of the Interference Canceller 10. The continuously sampled signal flows along a path 34 from the canceller's output 32 to a second input 36 of the Weight Application Circuit 26. The degree to which the interference signal remains at the canceller's output 32 is dependent on the design of the Weight Application Circuit 26, designs of which are well known in the art.

Figure 2:
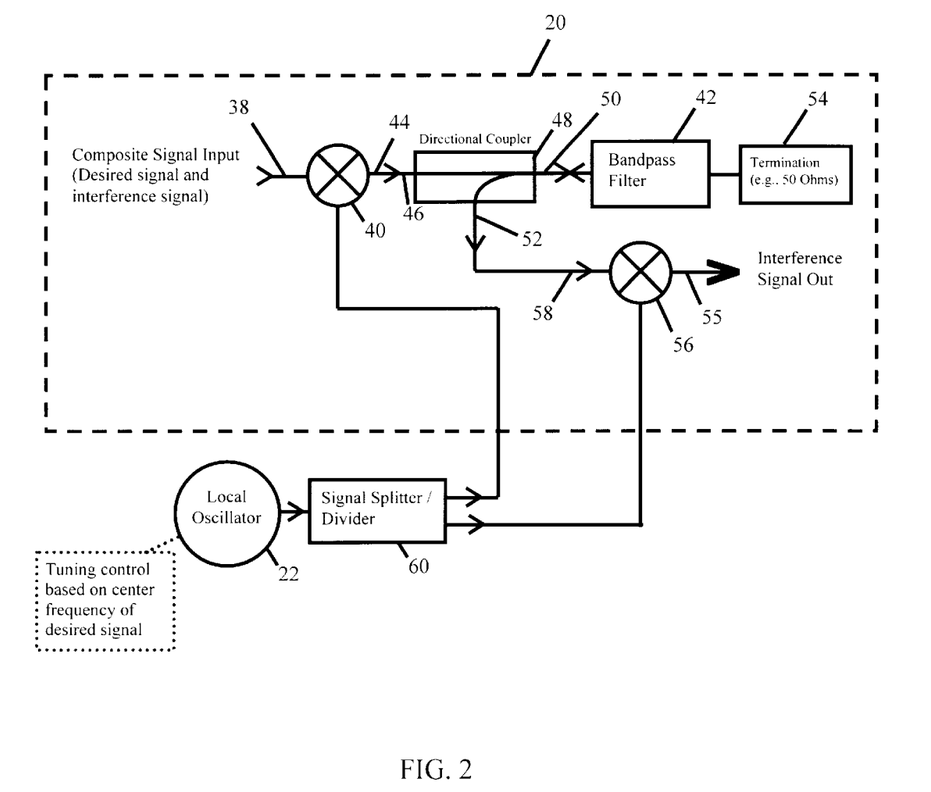
FIG. 2 illustrates a block diagram of a first embodiment of a reference circuit of the preferred embodiment of FIG. 1.

FIG. 2 illustrates a block diagram of a first embodiment of a Reference Circuit 20 of the preferred embodiment of FIG. 1. The composite signal input from the second path 18 (FIG. 1) of the input device 14 (FIG. 1) is applied to a first port 38 of a first frequency converter 40. The first frequency converter 40 may be used to either up- or down-convert the composite signal to an intermediate frequency. Choice of intermediate frequency may depend on, but is not limited to, such aspects as availability of circuit components, size limitations, and other circuit design and manufacture considerations. The intermediate frequency may preferably be the center frequency of an IF bandpass filter 42.

A second port 44 of the first frequency converter 40 is connected to a first port 46 of a directional coupler 48. The directional coupler 48 allows signal to flow from the first port 46 of the directional coupler 48 to a second port 50 of the directional coupler 48 with modest insertion loss. The directional coupler 48 is designed to attenuate the signal flowing from the first port 46 to a third port 52 of the directional coupler 48. The directional coupler 48 is designed to allow signal to flow, with some nominal attenuation, from the second port 50 to the third port 52. The signal flowing from the second port 50 to the third port 52 is referred to as the "coupled" signal. In the embodiment of FIG. 2, the coupled signal is a reduced amplitude copy, minus the desired signal, of the signal flowing from the second port 50 to the first port 46. Other devices, having similar signal flow directionality features may be used, such as a circulator.

A bandpass filter 42 is operatively connected to the second port 50 of the directional coupler 48. The bandpass filter 42 has a center frequency that is preferably approximately equal to the intermediate frequency of the Reference Circuit 20 (i.e., the center frequency of the desired signal offset by the local oscillator 22 frequency of the first frequency converter 40). The passband of the bandpass filter 42 is preferably wide enough to allow the desired signal to pass through the bandpass filter 42 and into a termination 54. The termination 54 absorbs the desired signal passing through the bandpass filter 42 and thus suppresses that portion of the desired signal that might be reflected back through the directional coupler 48 and toward a second frequency converter 56. The stopband of the bandpass filter 42 is preferably designed to present a poor impedance match to the interference signal. The interference signal will thus be reflected from the input of the bandpass filter 42 and directed back into the second port 50 of the directional coupler 48, into the coupled path of the directional coupler 48, and output from the third port 52 of the directional coupler 48. The third port 52 of the directional coupler 48 is connected to a first port 58 of the second frequency converter 56.

The second frequency converter 56 down- or up-converts the interference signal, which has been reflected from the input of the bandpass filter 42 and directed by the directional coupler 48 to the second frequency converter's 56 input port 58. The second frequency converter 56 converts the signal reflected from the bandpass filter 42 to the original frequency of the interference signal through use of the same local oscillator 22 frequency used by the first frequency converter 40. Thus, the output 55 of the second frequency converter 56 is a likeness of the composite signal in which the desired signal has been suppressed, leaving substantially only the interference signal. This likeness of the interference signal is used as a reference signal and applied to a Weight Application Circuit 26 (FIG. 1).

The local oscillator 22 may be, for example, a tunable frequency source or synthesizer. Its output is applied to both the first frequency converter 40 and the second frequency converter 56 via a signal splitter/divider 60. Applying the local oscillator 22 output to each frequency converter 40, 56 allows the first frequency converter 40 to, for example, down-convert the composite input signal to the intermediate frequency of the Reference Circuit 20 while the second frequency converter 56 up-converts the intermediate frequency back to the original input frequency band occupied by the composite signal. The local oscillator's 22 center frequency is preferably chosen such that the center frequency of the desired signal is converted to approximately the center frequency of the bandpass filter 42. The preferred embodiment may function without knowledge of the frequency or spectral content of the interference signal(s). Other frequency conversion schemes are possible, such as multiple up- or down-conversions.

The embodiment described above derives a likeness of the interference signal by suppressing the desired signal contained within a composite of the desired and interference signals. Suppression of the desired signal may alternatively be accomplished by effecting a notch filter, such as a Filtronetics model FN-2716 70 MHz notch filter, in place of the directional coupler 48, bandpass filter 42, and termination 54 combination illustrated in FIG. 2. Such an alternate embodiment is illustrated in FIG. 3.

Figure 3:
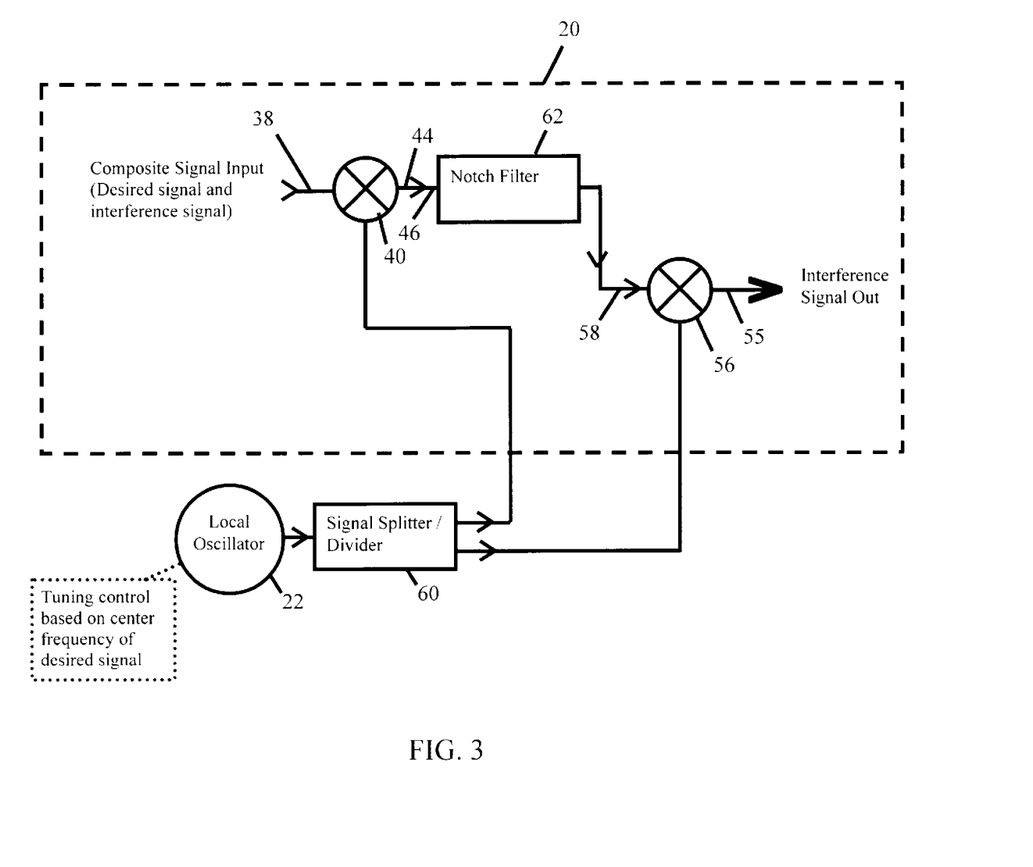
FIG. 3 illustrates a block diagram of an alternate embodiment of a reference circuit of the preferred embodiment of FIG. 1.

FIG. 3 illustrates a block diagram of an alternate embodiment of the Reference Circuit 20 of the preferred embodiment of FIG. 1. In the alternate embodiment of FIG. 3, a notch filter 62 suppresses the desired signal from the frequency translated composite signal. The intermediate frequency of the Reference Circuit 20 of FIG. 3 is chosen such that the center frequency of the desired signal is converted to approximately the center frequency of the notch filter 62. All other aspects of the Reference Circuit 20 remain as explained above.

The preferred embodiments of the Interference Canceller 10 preferably operate on interference signals that are separated from the desired signal by at least a half-bandwidth of the desired signal. In one preferred embodiment, the channel separation is approximately 25 kHz, the separation between desired and interference signals is approximately 25 kHz, and the input frequencies lie within approximately 112 to 137 MHz. Other frequency bands of operation are also possible. The preferred embodiments of the Interference Canceller 10 do not operate on the undesired signal energy that is within about the channel of the desired signal (i.e., in-channel). However, cancellation of this in-channel energy should be easier for receiver circuitry that is preceded by the preferred embodiment of the Interference Canceller 10 (than for receiver circuitry that is not preceded by the preferred embodiment of the Interference Canceller 10) because the interference-to-desired signal power ratio is smaller on the Interference Canceller's 10 output 32 than on its input 12.

The preferred embodiments of the Interference Canceller 10 serve to provide additional dynamic range in applications that use, for example, analog to digital converters. The preferred embodiments suppress strong interference signals, thereby reducing the difference between desired and interference signal levels prior to digitization. A potential application of the technique includes directional spatial processing systems or electronic surveillance systems that require large instantaneous dynamic ranges.

Figure 4:
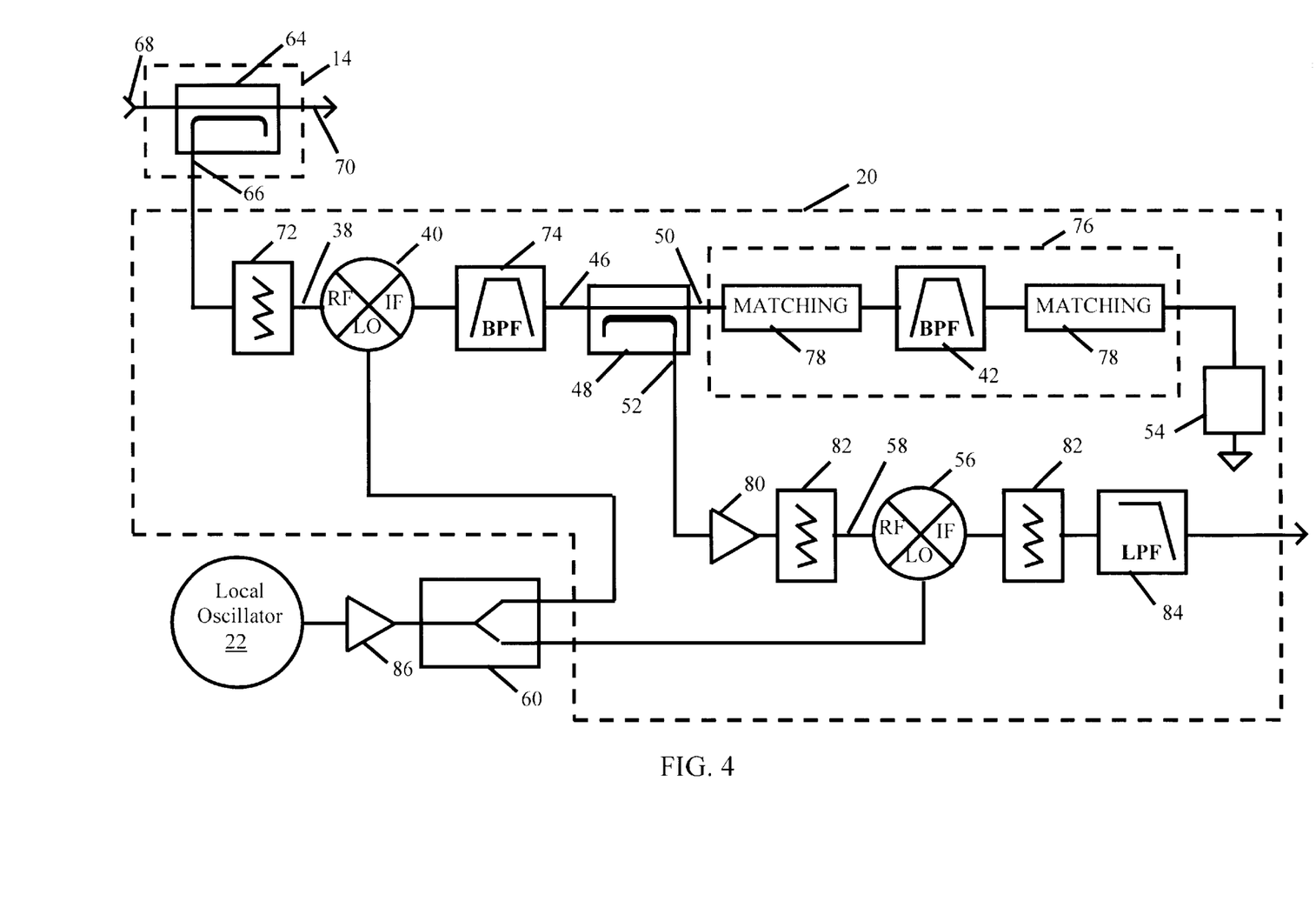
FIG. 4 illustrates a more detailed block diagram of the first embodiment of the reference circuit of FIG. 2.

FIG. 4 illustrates a more detailed block diagram of the first embodiment of the Reference Circuit 20 of FIG. 2, along with an input device 14, and local oscillator 22. In the embodiment of FIG. 4 the Reference Circuit 20 includes a directional coupler 48, bandpass filter 42, and termination 54 as described in the text associated with FIG. 2.

In the preferred embodiment of FIG. 4, the input device 14 includes a directional coupler 64 such as Mini-Circuits® model TDC-10-1 with a coupling value of approximately 10 dB. The input device 14 provides an attenuated version (i.e., approximately −10 dB) of the composite signal from a coupled port 66. The path from the input device's input port 68 (same as 12 FIG. 1) to its output port 70 is referred to as the "through path." Signal passing through the through path can be summed with the phase and amplitude adjusted likeness of the interference signal from the Weight Application Circuit 24 (FIG. 1) for cancellation.

In the preferred embodiment, an attenuator 72, such as a 3 dB attenuator, is connected between the coupled port 66 of the input device 14 and the first port 38 of the first frequency converter 40. The attenuator 72 improves the impedance match between the coupled port 66 of the input device 14 and the first port 38 of the first frequency converter 40. Placement of attenuators or other buffering devices between RF or IF components to improve match therebetween is well known in the art and will not be discussed herein. In this embodiment, a Mini-Circuits® model TUF-1HSM mixer may be used as the first frequency converter 40, although other devices may be used. The first frequency converter 40 preferably has a high dynamic range. The first frequency converter 40 may either up- or down-convert the input composite signal spectrum to an intermediate frequency approximately equal to the center frequency of the bandpass filter 42.

A second bandpass filter 74 is connected between the output of the first frequency converter 40 and the input of the directional coupler 48. The second bandpass filter 74 removes artifact frequencies (e.g., spurs, intermods, etc.) resulting from nonlinearites in the first frequency converter 40.

The output of the second bandpass filter 74 is connected to the first port 46 of the directional coupler 48. A composite signal incident on the first port 46 will contain both the desired and interference signals. This composite signal is passed through the directional coupler 48 to the second port 50 of the directional coupler 48. The embodiment of FIG. 4 may utilize a Mini-Circuits® model TDC-6-1 directional coupler. Other directional couplers or devices may be used. The signal exiting the second port 50 of the directional coupler 48 is applied to a bandpass filter circuit 76. In the embodiment of FIG. 4, the bandpass filter circuit 76 includes input and output matching filters 78. In this embodiment the matching filters 78 may be T-filters; each includes a pair of series inductors and a shunt capacitor to ground connected to the common node of the series inductors, although other filter configurations may be used. The matching filters 78 preferably match the nominal impedance of the Reference Circuit 20 (e.g., 50 Ohms) to the impedance of the bandpass filter 42. The matching filters 78 may also be used to equalize group delay across the stopbands of the bandpass filter circuit 76. In the preferred embodiment the bandpass filter 42 may be a Piezo Technology, Inc. model PTI-7335 crystal filter having a center frequency of approximately 44.95 MHz. Other filters and nominal impedances may be used. Input and output matching filters 78 may or may not be required depending on the nominal impedance of the bandpass filter selected. Signals within the passband of the bandpass filter 42, including the desired signal, are passed through the bandpass filter circuit 76 to the termination 54. In the preferred embodiment the termination 54 is a 50 Ohm resistor. Other values of termination, which provide an absorptive termination to the output of the bandpass filter and any bandpass filter matching circuit, may be used.

Signals outside the passband of the bandpass filter 76 are reflected from the input of the bandpass filter circuit 76 and are incident at the second port 50 of the directional coupler 48. The signal incident on the second port 50 is coupled through the coupled port 52 of the directional coupler 48 toward the second frequency converter 56. In the embodiment of FIG. 4, the coupling is approximately 6 dB. Other values may be used. The signal emerging from the coupled port 52 of the directional coupler 48 is predominantly a likeness of the interference signal.

In the embodiment of FIG. 4, the signal output from the coupled port 52 of the directional coupler 48 is amplified by an intermediate frequency ("IF") amplifier 80. The IF amplifier 80 also acts as a buffer, typically having good reverse isolation from its output back through its input. The IF amplifier may be a M/A-Com model MSA-2111. Selection of dc blocking caps, current select resistor, choke inductor, and bypass capacitors (not shown) are well known to those of ordinary skill in the art and are not explained herein. Other amplifiers may be utilized. Amplification and/or buffering between the coupled port 52 of the directional coupler 48 and the first port 58 of the second frequency converter 56 is application dependent and may not be required. In the embodiment of FIG. 4, the first frequency converter 40 and the second frequency converter 56 are the same model of device; however, dissimilar devices may be used. In the embodiment of FIG. 4, the impedance match of the second frequency converter 56 is improved by the series addition of attenuators 82 both before and after the second frequency converter 56. Amplification and/or buffering before and after the second frequency converter 56 is application dependent and may not be required.

A low pass filter 84 serves to suppress any local oscillator signal and spurious mixer products leaking out of the second frequency converter 56. Use of the low pass filter 84 is application dependent and may not be required.

In the embodiment of FIG. 4, the local oscillator ("LO") 22 output is applied to the Reference Circuit 20 after buffering/amplification by an LO amplifier 86. The LO frequency is derived from knowledge of the desired signal's channel frequency. In the preferred embodiment the LO frequency is the sum of the desired signal's channel center plus the intermediate frequency (i.e., the bandpass filter's 42 or notch filter's 62 center frequency). In the embodiments of FIGS. 2 and 4 the intermediate frequency was 44.95 MHz. In the embodiment of FIG. 3 the intermediate frequency was 70 MHz. Other intermediate frequencies may be chosen. The LO signal is preferably divided into two paths of approximately equal power level by a splitter/divider 60 such as a Mini-Circuits® model LRPS-2-1. Other splitters/dividers may be used.

With reference to FIG. 1, the function of the Weight Application Circuit 26 is to scale the amplitude and phase of the Reference Circuit's 20 output. This output contains a likeness of the interference signal. Summing Circuit 28 sums this likeness of the interference signal with the composite signal traveling in the first path 16. The result is a residual error signal 34. The residual error signal is fed back to the second input port 36 of the Weight Application Circuit 26. This residual error signal, containing partially cancelled interference signal as well as the desired signal, is correlated via the Least Mean Square ("LMS") algorithm against the Reference Circuit's 20 output signal. If the degree of this correlation is high, meaning the error signal contains substantial interference signal, the correlator's output is integrated slightly to alter the previous value of weight. The weight is simply a gain value, which changes quickly during weight convergence, and stabilizes when the error signal falls below some threshold. This condition means that the receiver's input (i.e., the interference canceller's output 32) will contain a substantially attenuated interference signal and a substantially unattenuated desired signal.

In the preferred embodiment the Weight Application Circuit 26 is an analog-based LMS algorithm, which uses operational amplifiers, analog signal processing components, including a four-quadrant multiplier, and sample and hold devices. The four-quadrant multiplier and an active integrator, which contains considerable DC gain measured in Volts/second, are the primary components used in the correlation process.

The Weight Application Circuit 26 may be understood in terms of being the core of a three tap adaptive filter, where the value three is a compromise between cancellation depth, circuit complexity and cost. The application's requirements will dictate the cancellation depth and, consequently, the number of taps. A weight control circuit is included in the Weight Application Circuit 26. The weight control circuit, which is well known in the art, tells the Weight Application Circuit 26 when to start weight-adapting, when to stop, when to reset the integrators, when to sample, and when to hold the final weight values.

The output of the Weight Application Circuit 26 is therefore the weighted likeness of the interference signal. It must be sufficiently high in signal level to be "perfectly" (i.e., ideally) subtracted from the composite signal spectrum. This level is dictated by user requirements and, if this level is considerably high, an amplifier with high dynamic range may be inserted in the Weight Application Circuit's 26 output.

The embodiments described herein are intended to be illustrative and not limiting. It will be appreciated that many variations are possible within the scope and spirit of the invention.

What is claimed is:

1. An interference canceller comprising:
   an input receiving an input signal containing both a desired input signal component and an interference input signal component;
   a first circuit receiving a likeness of the input signal and generating a radio frequency first likeness of the interference input signal component;
   a second circuit receiving a likeness of the input signal and a likeness of the interference input signal component, said second circuit producing an output signal containing at least a desired output signal component correlated to the desired input signal component and;
   wherein when the output signal also contains an interference output signal component correlated to the interference input signal component, the proportion of the interference output signal component in the output signal is reduced relative to the proportion of the interference input signal component in the input signal.

2. The interference canceller of claim 1 further comprising an input device receiving the input signal and generating first and second likenesses of the input signal.

3. An interference canceller as in claim 1, wherein said input device is a directional coupler.

4. The interference canceller of claim 1 further comprising an application circuit receiving a likeness of the interference input signal component and a likeness of the output signal, and generating a second likeness of the interference input signal component.

5. The interference canceller of claim 1 wherein the second circuit is a summing circuit.

6. The interference canceller as in claim 5, wherein said summing circuit is a directional coupler.

7. The interference canceller of claim 1, wherein said desired input signal component and said interference input signal component are independent from each other.

8. The interference canceller of claim 1, wherein the interference canceller does not have access to the desired input signal component independent from the input signal.

9. A method of reducing interference in a signal comprising the steps of:
receiving an input signal containing a desired input signal component and an interference input signal component;
forming a radio frequency first likeness of the interference input signal component;
processing a likeness of the interference input signal component and a likeness of the input signal to form an output signal containing at least a desired output signal component that is correlated to the desired input signal component and;
wherein when the output signal has an interference output signal component that is correlated to the interference input signal component, the proportion of the interference output signal component in the output signal is reduced relative to the proportion of the interference input signal component in the input signal.

10. The method of claim 9 further comprising steps of forming first and second likenesses of the input signal.

11. The method of claim 9 wherein the processing step includes a step of suppressing, from the likeness of the input signal, a component derived from a likeness of the interference input signal component.

12. The method of claim 11 wherein the suppressing step includes a step of summing a likeness of the interference input signal component with a likeness of the input signal.

13. The method of claim 9 further including steps of:
forming a second likeness of the interference input signal component from the first likeness of the interference input signal component.

14. The method of claim 13 wherein the step of forming a second likeness of the interference input signal component includes steps of:
monitoring the output signal; and
adjusting the second likeness of the input interference signal component to reduce a measure of the interference output signal component in the output signal.

15. An interference canceller comprising:
an input receiving an input signal containing both a desired input signal component and an interference input signal component;
a reference circuit receiving a likeness of the input signal and generating a first likeness of the interference input signal component;
an application circuit receiving a likeness of the interference input signal component and a likeness of an output signal, and generating a second likeness of the interference input signal component; and
a cancellation circuit receiving a likeness of the input signal and the second likeness of the interference input signal component, said cancellation circuit producing the output signal containing at least a desired output signal component correlated to the desired input signal component; and
wherein when the output signal also contains an interference output signal component correlated to the interference input signal component, the proportion of the interference output signal component in the output signal is reduced relative to the proportion of the interference input signal component in the input signal.

16. The interference canceller of claim 15 further comprising an input device receiving the input signal and generating first and second likenesses of the input signal.

17. An interference canceller as in claim 16, wherein said input device includes a directional coupler.

18. The interference canceller of claim 15 wherein said cancellation circuit is a summing circuit.

19. The interference canceller as in claim 18, wherein said summing circuit is a directional coupler.

20. A method of reducing interference in a signal comprising the steps of:
receiving an input signal containing a desired input signal component and an interference input signal component;
forming a first likeness of the interference input signal component;
processing a second likeness of the interference input signal component and a likeness of the input signal to form an output signal containing at least a desired output signal component that is correlated to the desired input signal component; and
wherein when the output signal has an interference output signal component that is correlated to the interference input signal component, the proportion of the interference output signal component in the output signal is reduced relative to the proportion of the interference input signal component in the input signal; and
receiving the first likeness of the interference input signal component and a likeness of the output signal, and generating the second likeness of the interference input signal component.

21. The method of claim 20 further comprising steps of forming first and second likenesses of the input signal.

22. The method of claim 20 wherein the processing step includes a step of suppressing, from the likeness of the input signal, a component derived from a likeness of the interference input signal component.

23. The method of claim 22 wherein the suppressing step includes a step of summing a likeness of the interference input signal component with a likeness of the input signal.

24. The method of claim 20 wherein the step of forming a second likeness of the interference input signal component includes steps of:
monitoring the output signal; and
adjusting the second likeness of the input interference signal component to reduce a measure of the interference output signal component in the output signal.

* * * * *